UNITED STATES PATENT OFFICE

HARRY BULL AND LAWRENCE JOHNSON, OF SHEFFIELD, ENGLAND, ASSIGNORS OF ONE-THIRD TO JOHN HERBERT AITCHISON, OF SHEFFIELD, ENGLAND

ELECTRODE OR ROD FOR WELDING

No Drawing. Application filed October 21, 1930, Serial No. 490,330, and in Great Britain October 25, 1929.

This invention relates to electrodes or rods for welding various metals and alloys, both ferrous and non-ferrous, particularly those known as stainless steel or iron, its object being to provide improvements in the manufacture of the electrodes or welding rods.

It is common practice to use electrodes or welding rods of the same composition as the alloy steel to be welded but some alloys and most of the stainless and other high alloy steels and irons are difficult to produce in the required form of wire, and it has therefore been proposed to add ferrous alloys (of the metals alloyed in the material to be welded) to the exterior of suitable rods by means of non-metallic binding or cementing substances, but it is found that the alloying metals are apt to become entangled in the slags during welding and do not unite with the inner rod to give the required amount in the weld.

According to the present invention, however, these difficulties and defects are overcome by providing a billet or its equivalent of one or more of the metals to be welded with one or more longitudinal cores or coverings of the other metal or metals of the alloy, and then working the composite billet into a composite electrode or welding rod by rolling, forging or drawing.

One hole of the billet may contain two or more of the other metals of the alloy disposed concentrically therein, and the whole of the billet may be lined or its exterior coated with one or more of the metals of the alloy applied by electro-deposition. Similarly a core of the billet may be coated with one or more of the metals of the alloy applied by electro-deposition.

As an example, an electrode or rod for welding stainless steel containing fifteen per cent of chromium and eleven per cent of nickel, may be made by providing a billet of chromium steel containing twenty per cent of chromium and nought decimal one per cent of carbon and forming a hole along the axis of the billet. This hole is filled by a rod of nickel which may be held in position by welding or riveting it at the ends of the billet. The diameter of the hole in the billet and of the rod of nickel therein is such that the nickel represents approximately ten per cent of the weight of the composite billet which is then heated and rolled to form a rod. The rolled rod is cold drawn (after being annealed if necessary) into wire of the required gauge to form an electrode or welding rod which in use melts to form a welding joint containing decimal nought nine per cent of carbon, eighteen per cent of chromium and eight per cent of nickel.

It will be understood that the nickel forms a core in the billet and will be operated upon by the rolling and drawing operations as if it were an integral part thereof. During these operations it will be forced into such intimate contact with the billet that in the finished electrode or welding rod a steadier arc will be obtained than when the materials are made up into an electrode with the aid of binders or cement, and that consequently losses from oxidation due to intermittent arcing will be lessened. The electrodes will also have a lower electric resistance and their heating during welding will be substantially reduced.

The core of the billet may itself be of a composite nature when there is a greater number of alloying metals than in the example given above. Thus a sleeve or liner containing the desired elements such as tungsten, manganese, vanadium, or silicon, for example, may be interposed between the nickel core and the chromium steel billet. Similarly such other additional alloying metals may be provided by electro-deposition on the core or inside the hole of the billet or in the form of a metallic powder.

If desired the alloying metals, or one of them, may be inserted into a hole of the billet by a casting operation and in this way a central core may be secured in place by casting one or more of the other alloying metals into an annular space between the core and the main body of the billet.

In a modification the composite billet or equivalent mass is built up from a central core by adding the other materials to its exterior by electro-deposition, by spraying, by wrapping them around it in the form of wire, or by a casting operation. The composite mass is finally forged or rolled and drawn into sizes suitable for electrodes or welding rods.

What we claim is:—

1. The method of making a welding rod, for welding a ferrous alloy, by providing a billet in which at least two of the metals in the alloy to be welded are alloyed, by disposing such billet and the remainder of the alloy metals as parts of a composite billet in which one part forms a core and another part a cover therefor, and by working the composite billet into a composite welding rod by heating the billet, rolling it to rod form while hot, and cold-drawing the rolled rod into wire of the required gauge, substantially as specified.

2. The method of making a welding rod for welding a ferrous alloy, by providing a billet in which at least two of the metals in the alloy to be welded are alloyed, by making a plurality of longitudinal holes in such billet, one hole for each of the remaining alloy metals, by filling each hole with its respective metal to form a composite billet and by working the composite billet into a composite welding rod by heating the billet, rolling it to rod form while hot, and cold-drawing the rolled rod into wire of the required gauge, substantially as specified.

3. The method of making a welding rod, for welding a ferrous alloy, by providing a billet in which at least two of the metals in the alloy to be welded are alloyed, by disposing such billet and the remainder of the alloy metals as concentric parts of a composite billet and by working the composite billet into a composite welding rod by heating the billet, rolling it to rod form while hot, and cold-drawing the rolled rod into wire of the required gauge, substantially as specified.

4. The method of making a welding rod, for welding a ferrous alloy, by providing a hollow billet in which at least two of the metals in the alloy to be welded are alloyed, by lining the hollow of the billet with another of the alloy metals applied by electro-deposition, by filling the lined hollow with the remainder of the alloy metals to form a composite billet and by working the composite billet into a composite welding rod in an elongating process, substantially as specified.

5. The method of making a welding rod, for welding a ferrous alloy, by providing a billet in which at least two of the metals in the alloy to be welded are alloyed, by coating the exterior of the billet with another of the alloy metals applied by electro-deposition to form a composite billet and by working the composite billet into a composite welding rod by heating the billet, rolling it to rod form while hot, and cold-drawing the rolled rod into wire of the required gauge, substantially as specified.

6. The method of making a welding rod, for welding a ferrous alloy, by providing a hollow billet in which at least two of the metals in the alloy to be welded are alloyed, by providing a core fitting the hollow of the billet and comprising one of the alloy metals applied to the remainder thereof by electro-deposition, by inserting the core in the hollow to form a composite billet and by working the composite billet into a composite welding rod by heating the billet, rolling it to rod form while hot, and cold-drawing the rolled rod into wire of the required gauge, substantially as specified.

7. The method of making a welding rod, for welding a ferrous alloy, by providing a composite billet of the alloy metals built up from a central core in which at least two of the metals in the alloy to be welded are alloyed, by adding the remainder of such metals to its exterior by electro-deposition, and by working the composite billet into a composite welding rod by heating the billet, rolling it to rod form while hot, and cold-drawing the rolled rod into wire of the required gauge, substantially as specified.

8. The method of making a welding rod, for welding a ferrous alloy, by providing a composite billet of the alloy metals built up from a central core in which at least two of the metals in the alloy to be welded are alloyed, by adding the remainder of such metals to its exterior by spraying, and by working the composite billet into a composite welding rod by heating the billet, rolling it to rod form while hot, and cold-drawing the rolled rod into wire of the required gauge, substantially as specified.

9. The method of making a welding rod, for welding a ferrous alloy, by providing a composite billet of the alloy metals built up from a central core in which at least two of the metals in the alloy to be welded are alloyed, by adding the remainder of such metals to its exterior by a wrapping process, and by working the composite billet into a composite welding rod by heating the billet, rolling it to rod form while hot, and cold-drawing the rolled rod into wire of the required gauge, substantially as specified.

10. The method of making a welding rod, for welding a ferrous alloy, by providing a composite billet of the alloy metals built up from a central core in which at least two of the metals in the alloy to be welded are alloyed, by adding the remainder of such metals to its exterior by a casting operation, and by working the composite billet into a composite welding rod in an elongating process, substantially as specified.

11. The method of making a welding rod for welding stainless steel containing fifteen per cent of chromium and eleven per cent of nickel, by providing a billet of chromium steel containing twenty per cent of chromium and decimal one per cent of carbon, by providing the billet with a core of nickel forming ten per cent of the weight of the composite billet, by rolling the composite billet while hot to form a rod, by drawing the rod to form a wire and by cutting the wire into lengths each to form a welding rod, substantially as specified.

In testimony whereof we hereunto affix our signatures.

HARRY BULL.
LAWRENCE JOHNSON.